United States Patent
Aulanko et al.

(10) Patent No.: US 7,410,043 B2
(45) Date of Patent: Aug. 12, 2008

(54) ARRANGEMENT FOR COUPLING PALLETS OF A TRAVELATOR

(75) Inventors: Esko Aulanko, Kerava (FI); Jorma Mustalahti, Hyvinkää (FI); Marc Ossendorf, Bochum (DE)

(73) Assignee: Kone Corporation, Helsinki (FI)

( * ) Notice: Subject to any disclaimer, the term of this patent is extended or adjusted under 35 U.S.C. 154(b) by 32 days.

(21) Appl. No.: 11/497,532

(22) Filed: Aug. 2, 2006

(65) Prior Publication Data
US 2007/0029162 A1    Feb. 8, 2007

Related U.S. Application Data

(63) Continuation of application No. PCT/FI2005/000007, filed on Jan. 5, 2005.

(30) Foreign Application Priority Data
Feb. 2, 2004    (FI) ................... 20040157

(51) Int. Cl.
*B65G 17/42*    (2006.01)
*B66B 23/02*    (2006.01)

(52) U.S. Cl. .................... 198/333; 198/838
(58) Field of Classification Search ............. 198/333, 198/330, 332, 327, 838, 845
See application file for complete search history.

(56) References Cited

U.S. PATENT DOCUMENTS

| | | | | |
|---|---|---|---|---|
| 3,247,947 A * | 4/1966 | Fox et al. | ................... | 198/325 |
| 3,530,799 A * | 9/1970 | Braun | .................... | 198/845 |
| 3,964,596 A | 6/1976 | Heusler et al. | | |
| 4,064,986 A * | 12/1977 | Bertovich | ................ | 198/326 |
| 4,130,192 A * | 12/1978 | Kraft | ..................... | 198/327 |
| 4,645,059 A | 2/1987 | Hofling et al. | | |
| 5,072,821 A * | 12/1991 | Kruse et al. | ................ | 198/327 |
| 5,358,089 A * | 10/1994 | Riedel | ..................... | 198/333 |
| 5,553,697 A * | 9/1996 | McClement | ................ | 198/332 |
| 5,595,278 A * | 1/1997 | Ostermeier et al. | ......... | 198/333 |
| 5,697,487 A * | 12/1997 | Engelke et al. | ............. | 198/333 |
| 5,785,166 A | 7/1998 | Hoefling et al. | | |
| 5,810,148 A * | 9/1998 | Schoeneweiss | ............ | 198/333 |
| 5,918,722 A | 7/1999 | Behle | | |
| 6,085,891 A | 7/2000 | Behle | | |
| 6,227,344 B1 | 5/2001 | Pallinger | | |
| 6,640,957 B2 * | 11/2003 | Fargo et al. | ................ | 198/321 |
| 6,988,608 B2 * | 1/2006 | Pietz | ....................... | 198/326 |
| 7,063,202 B2 * | 6/2006 | Ossendorf | .................. | 198/321 |

FOREIGN PATENT DOCUMENTS

DE      3828914 A1      3/1990

(Continued)

OTHER PUBLICATIONS

International Search Report for PCT/FI2005/000007 Mailed Aug. 26, 2005.

*Primary Examiner*—Douglas A Hess
(74) *Attorney, Agent, or Firm*—Venable LLP; Robert Kinberg

(57) ABSTRACT

An arrangement for coupling a pallet in a conveying device includes a pallet having wheels and forming a part of a transport track of the conveying device, and a drive element. A coupling piece is adapted to be connected to the pallet and a fastening parties connects the drive element to the coupling piece.

18 Claims, 3 Drawing Sheets

FOREIGN PATENT DOCUMENTS

| | | |
|---|---|---|
| DE | 9315150 U1 | 2/1995 |
| EP | 0 169 349 | 1/1986 |
| EP | 0 490 591 A2 | 6/1992 |
| EP | 0 606 990 A1 | 7/1994 |
| EP | 0 795 512 A1 | 9/1997 |
| WO | WO 2005/042388 A2 | 5/2005 |

* cited by examiner

ARRANGEMENT FOR COUPLING PALLETS OF A TRAVELATOR

CROSS-REFERENCE TO RELATED APPLICATIONS

This application is a continuation of International Application No. PCT/FI2005/000007 filed Jan. 5, 2005, designating the United States and claiming priority from application Ser. No. FI20040157 filed in Finland on Feb. 2, 2004, the disclosures of both foregoing applications being incorporated herein by reference.

BACKGROUND OF THE INVENTION

The present invention relates to an arrangement for coupling pallets of a travelator or equivalent.

Like escalators, travelators are conveying devices used to move people and goods. They differ from escalators e.g. in that they often work in a substantially horizontal position or in a position slightly inclined relative to their direction of motion, so that successive steps, i.e. pallets, form a substantially even and rectilinear transport track instead of stair-like steps as in escalators. Travelators are also referred to as moving sidewalks and autowalks.

In known travelators, autoramps and escalators, the pallets or steps are typically connected to an endless chain, belt or equivalent serving as a drive element by means of a separate coupling element. In known solutions, the coupling arrangements are complicated and often also require the use of special tools for the coupling to be successfully performed in the desired manner. Long travelators contain a large number of pallets, each one of which has to be coupled to the drive element either by one end or by both ends. These known coupling solutions and the associated adjustments are slow and complicated to implement, which is why the installation times are very long, especially when long travelators are to be installed. This is expensive and otherwise undesirable. In addition, maintenance and repair operations take a longer time because the release and re-mounting of known coupling elements is a slow process. Coupling elements of a larger size, which take up space around their path of motion and add to the weight of the structures present further problems. An additional problem in known coupling elements is the chain serving as a drive element, which has to be of a special construction due to the coupling. Such a chain, which is specific only to a given application, is generally expensive and may be difficult to obtain in urgent cases of repair.

SUMMARY OF THE INVENTION

An object of the present invention is to overcome the above-mentioned drawbacks and to achieve an arrangement for coupling pallets of a travelator, moving ramp or escalator or an equivalent apparatus, an arrangement that is of economical cost and allows easy coupling, and wherein the pallet is coupled especially to a chain functioning as a drive element moving the pallets.

The above and other objects are achieved according to the invention by the provision of an arrangement for coupling a pallet in a conveying device which in one exemplary embodiment includes: a pallet having wheels and forming a part of a transport track of the conveying device; a drive element; a coupling piece adapted to be connected to the pallet; and a fastening part connecting the drive element to the coupling piece.

The advantages provided by the pallet coupling arrangement of the invention include easy and fast installation, which means that the installation, maintenance and repair times are short and consequently the downtimes are also short. In addition, the coupling solution is simple and reliable, so the coupling is safe and requires no special tools in order to be successfully carried out. A further advantage is that the drive elements used may consist of standard chains, which are economical and quickly available when needed. Yet another advantage is that the coupling element is of small size and light weight, so the coupling solution does not take up much space around its path and the coupling pieces do not strain the travelator structures by their weight. A significant advantage is that the pallet can be connected to the chain from above. Thus, the pallet can be easily fastened to the chain during installation, and during maintenance or repair the pallet can be easily released from the chain and secured to it again. In the further exemplary embodiments of the invention, the pallet can be lowered to its position relative to the chain and the pallet track and connected to the chain without lateral movement of the chain or the pallet lowered into position. As the connection is easy to make and release, installation and maintenance work requires less time.

BRIEF DESCRIPTION OF THE DRAWINGS

In the following, the invention will be described in detail with reference to an exemplary embodiment and the accompanying drawings, wherein.

DETAILED DESCRIPTION OF EXEMPLARY EMBODIMENTS

Figure 1:
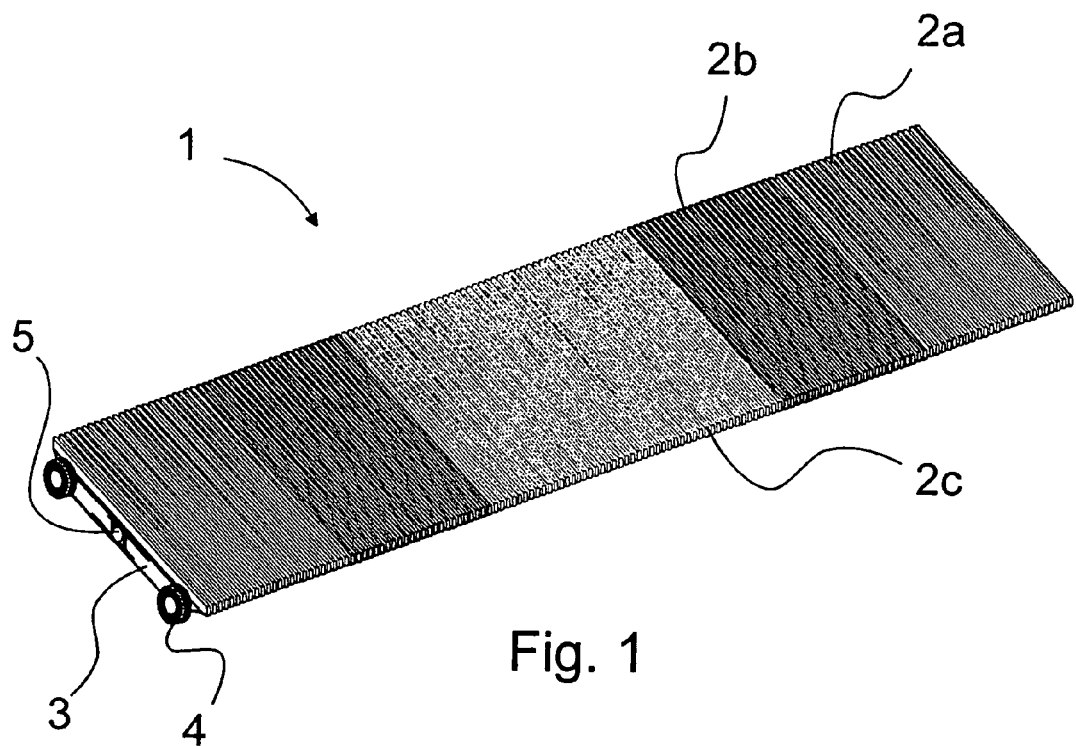
FIG. 1 shows an oblique top view of a typical pallet in which the coupling arrangement of the invention can be used.

Referring to FIG. 1, there is shown a pallet structure 1 comprising a pallet body 3, which has preferably been produced by extruding a suitable profile from aluminum or some other appropriate metal or metal alloy. During manufacture of the profile, a given profile is extruded in bars of a length suited for manufacture, transport or other purposes. Later during manufacture of the pallet, parts of a length exactly suited for the purpose are cut from these profiled bars. Thus, the same profile can easily be used for pallets of different lengths, which makes it easy to vary the width of the conveyor track of the travelator. Secured to the pallet body 3 are wheels 4 at each end of the pallet and likewise at least at one end a fastening element 20 (see for example FIGS. 3 and 5), by which the pallet 1 is coupled to an endless chain, toothed belt, rope or equivalent actuating element serving to move the pallets. The fastening element 20 is secured e.g. to a mounting hole 5 (FIGS. 1 and 2) provided at the end of the body 3. The holes and other shapes provided in the body 3 for mounting the fastening elements and wheels may be profile shapes or separately made in the profile.

Figure 2:
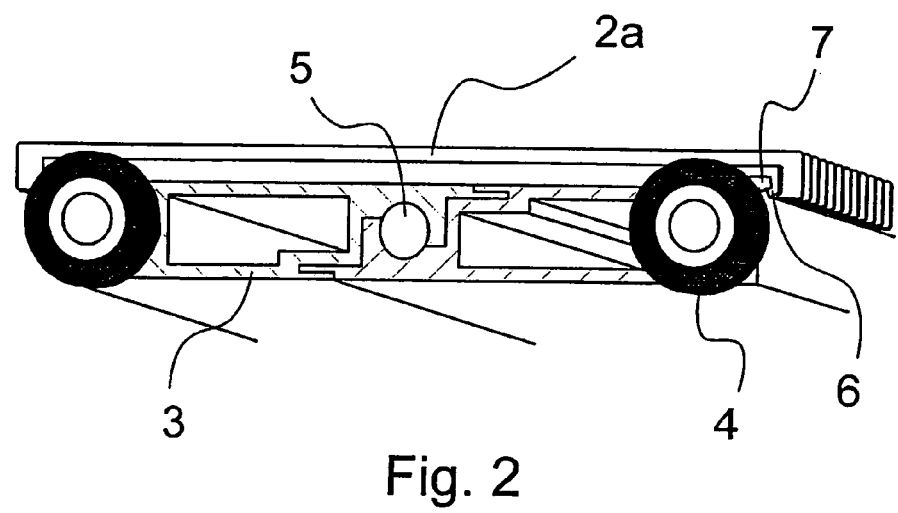
FIG. 2 shows a more detailed view of the pallet of FIG. 1 as seen from the end of the pallet.

As shown in FIG. 2, a surface part extruded from plastic or equivalent material is fastened onto the body 3 of the pallet 1 e.g. by snap-on couplings or corresponding shape-locked couplings. The surface part preferably consists of one or more surface plates 2a-2c (FIG. 1) of suitable width, which are also provided with the necessary corrugations in the direction of the pallet track. Each surface plate 2a-2c is provided with snap-on coupling elements or corresponding coupling elements 6, preferably in the lower part or on the lower surface of the surface plates, placed at suitable points, for example at the ends and in the middle part of the surface plates. The surface plates are thus firmly held in position on the pallet body 3 and can be easily pressed into position and also easily released from the body using a tool suited to the purpose. Correspondingly, placed at suitable points in the upper part of the pallet body 3 are counterparts 7 corresponding to the aforesaid coupling elements, so that the coupling elements 6 can be fastened to the counterparts in a shape-locked manner.

The width of the surface plates 2a-2c is so defined that, using a suitable number of surface plates of the same width, it is possible to cover pallet bodies of different lengths, so the same parts can be used to assemble pallets of different lengths.

FIGS. 1 and 2 show a pallet 1 provided with differently colored surface plates 2a and 2b and also transparent or translucent surface plates 2c. A notice, advertisement or other element varying the appearance, printed on paper, plastic or equivalent material may be placed under the transparent or translucent surface plates 2c, between the body 3 and the surface plate 2c. By illuminating such an element from below or from the side, various visual effects can be produced. The transparent or translucent surface plates 2c are preferably placed in the middle part of the pallet 1. By disposing surface plates of different colors in different places in the longitudinal direction of the pallet 1, the appearance of successive pallets may be varied. Thus, the appearance of the conveyor track of the travelator may be easily to changed.

The body 3 of the pallet 1 consists of one or more profiled parts placed side by side. The body 3 is preferably composed of two body halves consisting of identical, mutually upside-down oriented profiled parts, which are also horizontally conversely arranged. Thus, the two halves of the body can be easily cut off the same profiled bar and turned into mutually opposite positions and joined together during assembly of the body.

Figure 3:
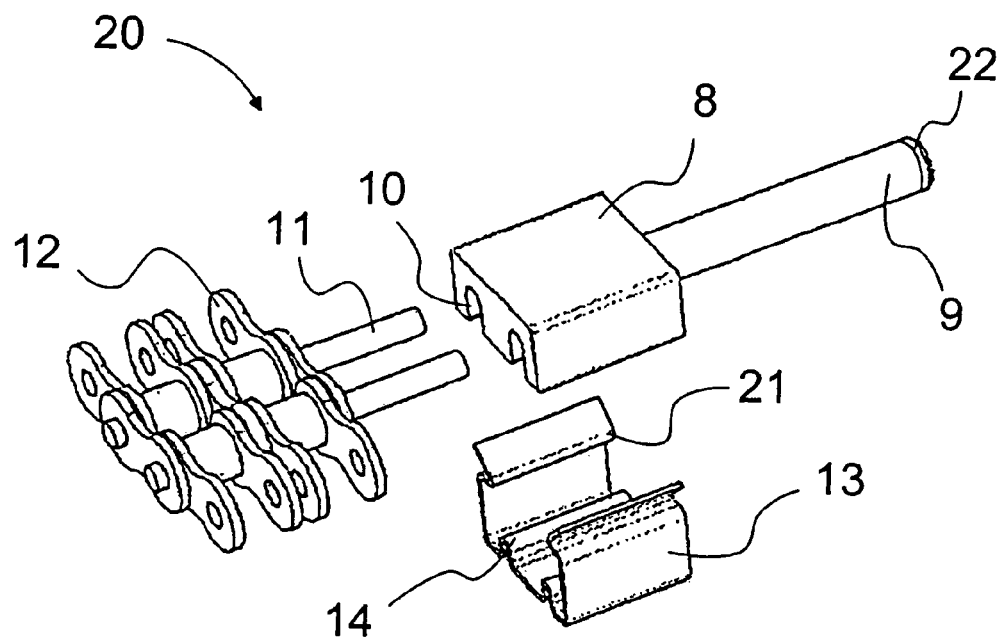
FIG. 3 shows an oblique top view of the main components of the pallet coupling arrangement according to an exemplary embodiment of the invention.
Figure 4:
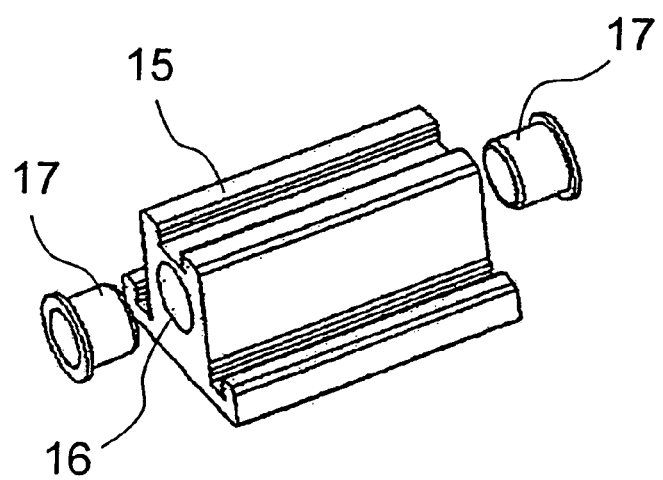
FIG. 4 shows a detail of a pallet coupling arrangement according to according to another exemplary embodiment of the invention in oblique top view.
Figure 5:
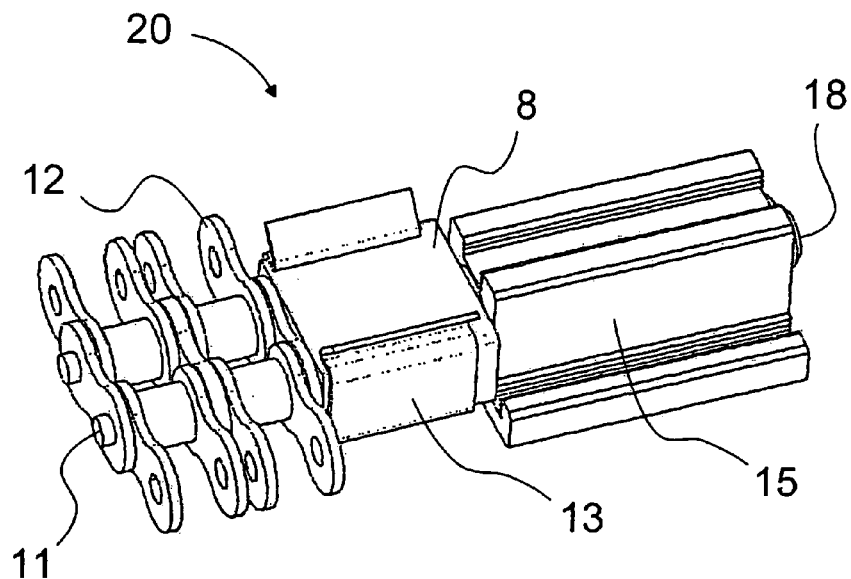
FIG. 5 shows an oblique top view of the main components of the pallet coupling arrangement of an exemplary embodiment of the invention in an assembled state.

FIGS. 3-5 present a fastening element 20 used in the coupling arrangement of the invention, designed to connect the pallet to the chain 12 that moves the pallets. The fastening element 20 comprises at least a coupling piece 8, a cylindrical shaft 9 fixedly secured to the coupling piece 8 and a locking element 13, such as a spring. Two downwards-opening slots 10 are provided in the lower surface of the coupling piece 8. The distance between the slots 10 corresponds to the distance between holes in the chain 12. The slots 10 extend in the same direction as the shaft 9 which is transversely, i.e. perpendicularly, to the direction of motion of the pallets 1. The width, height and radius of curvature at the upper edge of the slots 10 are designed so that two fastening pins 11 of a diameter corresponding to that of a normal chain pin can be inserted into the slots 10, yet without making the slot-and-pin coupling too loose. Since there are chains of many widths, the fastening pins 11 used may be normal longer chain pins of a wider chain instead of separate fastening pins. In this case, the longer chain pins function as fastening pins 11. Hereinafter, 'fastening pins' 11 refers to both longer chain pins and fastening pins specially made for this purpose.

The spring used as a locking element 13 is of a size and shape such that it can be locked onto the coupling piece 8 by spring force. The locking element 13 is a roughly U-shaped piece made from thin sheet metal, and it has in its bottom part two protrusions 14 whose size, orientation and mutual distance correspond to the size, orientation and mutual distance of the slots 10. Moreover, the locking element 13 has at each upper edge an inward elbow 21, which is fitted to meet the upper surface of the coupling piece 8 when the pallet is coupled to the chain. As the configuration of FIG. 3 illustrates, the coupling piece 8 holds the two fastening pins 11 in place, so that the drive element 20 is connected non-rotatably to the coupling piece 8.

FIG. 4 presents a more detailed view of the counter-structure in the body part of the pallet 1 for coupling the fastening element 20 to the pallet 1. The body 3 may be provided with a separate coupling piece 15 as shown in the figure, with a mounting hole 16 for the shaft 9 of the fastening element, or the body may be provided with a mounting hole 5 corresponding to hole 16 as mentioned above. In this case, no coupling piece 15 is needed. From the point of view of the invention, either solution will serve the same purpose. The mounting hole 5, 16, which is located at the end of the pallet in the area between the wheels 4, is provided with bushes 17 functioning as slide bearings so that, when mounted in the mounting hole 5, 16 through the bushes 17, the outer end of the shaft 9 extends over the innermost bush 17. This protruding outer end of the shaft is provided with a groove 22 whereby the shaft is locked in position in the axial direction by means of a circlip 18. Thus, the shaft 19 may be pivotally connected to the pallet body 3 by the bushes 17. A further feature characteristic of the shaft 9 is that the shaft 9 extends in the same direction as the fastening pins 11 and substantially in the same plane with the axes of the fastening pins, preferably at an equal distance from the axes of the fastening pins.

Figure 6:
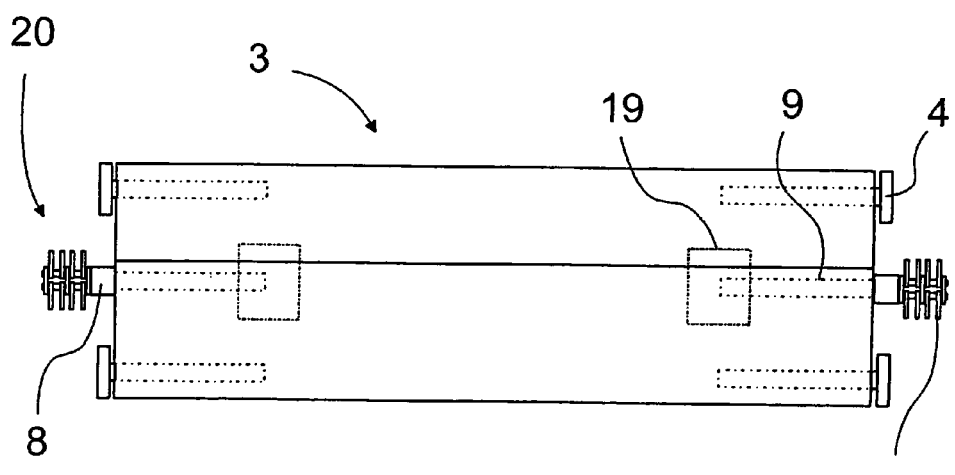
FIG. 6 shows a top view of a pallet provided with a pallet coupling arrangement according to a further exemplary embodiment of the invention.

If the shaft 9 is locked directly to the mounting hole 5 going through the entire pallet, then the lower surface of the pallet body has to be provided with recesses 19 as shown in FIG. 6 to allow the outermost bush 17 and the circlip 18 to be mounted in place. On the other hand, if a separate coupling piece 15 is used, then the pallet body has to be provided with a suitable space for this purpose.

FIG. 5 presents the pallet coupling arrangement in an assembled state. The coupling piece 15 may represent a separate piece or also a part of the pallet body. At the coupling point, instead of normal chain pins, the chain 12 may be provided with longer fastening pins 11, the other ends of which are inserted into the slots 10 in the lower surface of the coupling piece 8 so that the front surface of the coupling piece 8 is as close to the chain 12 as possible or in contact with the chain. With the fastening pins 11 in the slots 10, the locking element 13 is set from below onto the coupling piece 8 so that the protrusions 14 in the bottom of the locking element 13 press the fastening pins 11 against the upper surface of the slots 10 and that the elbow 21 extending inwards at each upper edge of the locking element 13 meets the upper surface of the coupling piece 8, pressing the locking element 13 tightly into position.

The structure of the fastening element 20 may differ from that described above. For example the coupling piece 8 and the locking element 13 may be of some other type than in the above description. The fastening element 20 may be, for example, so constructed that the shaft 9 is not a fixed part of the coupling piece 8, but instead the coupling piece 8 is provided with a hole which is used to fasten the coupling piece onto a locking shaft locking the two halves of the body 3 together. The end of the locking shaft extends far enough out of the central hole of the body 3 to allow the coupling piece to be locked onto the locking shaft, for example, by a circlip.

The locking element corresponding to locking element 13 may also be a structure like that presented in FIGS. 7 and 8. In FIG. 7, the locking element is a plate 23 which is provided with a central hole substantially corresponding to the cross-sectional shape of the coupling piece 8 and which is placed on the shaft 9 at the mounting stage. After the fastening pins 11 have been mounted into the slots 10 from below, the fastening pins are locked in place by pulling the plate 23 onto the coupling piece, thus preventing them from falling out of the slots. The plate 23 may additionally have at the lower edge of its central hole small upwards acting spring-like parts (not shown) pressing the fastening pins 11 to the slots 10. Such a structure provides the advantage of easy locking and release. In addition, for example, in connection with maintenance, the plate 23 will not be easily lost as it can be left on the shaft for the time of maintenance.

In FIG. 8, the locking element is a spring 24 corresponding to locking element 13. It has a construction that allows it to be pressed into position from above the coupling piece 8 in the direction of the arrow 25 to lock the fastening pins in the slots 10. In FIG. 8, the spring 24 depicted with a broken line represents the position of the spring before the spring 24 is locked in position on the coupling piece. The size of the spring 24 is so designed in relation to the coupling piece 8 that, when mounted in the locking position, the free ends of the spring will press the fastening pins into the slots 10 while the spring is simultaneously pressed against the upper surface of the coupling piece 8. The advantage of this embodiment is that it permits an easy and quick installation. A correctly designed spring 24 is easy to press onto the coupling piece 8. Likewise, the spring can be easily removed by means of a suitable tool.

Similarly, it is obvious that, instead of the use of locking elements 13, 23, 24, the slots 10 may be holes and the ends of the fastening pins 11 projecting from the chain can be locked on the back surface of the coupling piece 8 by means of circlips. In this case, the lower surface of the back part of the coupling piece may be provided with recesses or equivalent to allow the circlips to be mounted from the below. The recesses allow the surface of the locking piece to be evenly set against the pallet body. Instead of circlips, the fastening pins 11 may have bolt-like heads with a diameter larger than the shank part of the pin. In this case, the fastening pins can be inserted into the holes of the coupling piece 8 from the side of the pallet, whereupon the chain 12 is fastened by its holes to the fastening pins. The holes of the coupling piece are in this case provided with countersinks on the back surface for the heads of the fastening pins.

It is additionally possible that the coupling piece 8 has only one slot 10 or hole, in which is mounted only one fastening pin 11 or equivalent of a design such as a longer chain pin. This may be possible, for example, in light structures or if the chain 12 has thick pins in any case.

Instead of a fastening pin/fastening pins 11, the chain may also have another type of fastening part, for example, a chain link shaped to permit fastening or some other detent for engaging the coupling piece 8. In the case of another type of fastening part, the coupling piece is correspondingly specifically designed as required by such a detent. For example, a tooth-like peg provided with a hole and jutting out laterally from the side plate of a chain link could be coupled in the fastening element by means of a bolt or a suitable cotter pin arrangement.

It is likewise obvious that the shafts 9 may also function as locking shafts that lock the body structure composed of two separate profiled pieces together as a single assembly.

It is further obvious that, instead of a chain as described above, it is possible to use different types of chain structures or equivalent as a drive element.

It is further obvious to the person skilled in the art that the coupling piece 8 may be rigidly fastened relative to the link of the chain 12, or that the fastening to the pallet is implemented between the joints/pins of the chain 12 at the link whereby the fastening to the chain 12 takes place.

It will be understood that the above description of the present invention is susceptible to various modifications, changes and adaptations, and the same are intended to be comprehended within the meaning and range of equivalents of the appended claims.

What is claimed is:

1. An arrangement for coupling a pallet in a conveying device, comprising:
   a pallet having wheels and forming a part of a transport track of the conveying device;
   a drive element comprising a chain;
   a coupling piece including a shaft adapted to be pivotally connected to the pallet; and
   a fastening part comprising at least two fastening pins arranged securely in a joint hole of the chain, non-rotatably connecting the drive element to the coupling piece.

2. The arrangement according to claim 1, wherein the at least two fastening pins have a form fit connection to the coupling piece.

3. The arrangement according to claim 1, wherein the coupling piece is arranged to engage at a side of the chain.

4. The arrangement according to claim 1, wherein the at least two fastening pins are located in successive joint holes of the chain and are fitted to the coupling piece.

5. The arrangement according to claim 1, wherein the coupling piece has two slots extending transversely relative to a direction of motion of the pallet, the distance between the slots being substantially the same as the distance between the holes or joints of the chain, and when the pallet is coupled to the chain, the fastening pins are inserted through the chain holes or joints into the slots.

6. The arrangement according to claim 5, wherein the slots in the coupling piece are in a lower surface of the coupling piece, and the arrangement further comprises a locking element which is mountable on the coupling piece to lock the fastening pins in position.

7. The arrangement according to claim 6, wherein the locking element is a spring which is adapted to be locked onto the coupling piece so that the spring will press the fastening pins into position in the slots.

8. The arrangement according to claim 7, wherein the locking element includes protrusions arranged to press the fastening pins into position in the slots.

9. The arrangement according to claim 1, further including at least one bush, wherein the shaft is pivotally connected to the pallet body by the at least one bush.

10. The arrangement according to claim 9, wherein the shaft has a cylindrical shape.

11. The arrangement according to claim 1, wherein the pallet body has a hole extending transversely relative to a direction of motion of the pallet, and the shaft of the coupling piece fits in the hole in the pallet body.

12. The arrangement according to claim 1, and further including a circlip arranged to lock the coupling piece to make the coupling piece immovable in an axial direction of the shaft.

13. The arrangement according to claim 1, wherein pallet body includes pallet body halves, and the shaft is arranged to lock the halves of the pallet body together.

14. The arrangement according to claim 1, wherein the drive element comprises a chain, and the connection of the pallet to the chain by the shaft is arranged at an end of the pallet in an area between the wheels of the pallet.

15. The arrangement according to claim 1, wherein the at least two fastening pins having a form fit connection to the coupling piece, and the shaft extends in the same direction with the at least two fastening pins substantially in the same plane with axes of the fastening pins.

16. The arrangement according to claim 15, wherein the shaft extends at an equal distance from the axes of the fastening pins.

17. The arrangement according to claim 1, wherein the drive element comprises a chain and the coupling piece is rigidly secured relative to a link of the chain.

18. The arrangement according to claim 1, wherein the drive element comprises a chain and a fastening of the pallet to the chain is arranged at a side of a link of the chain, in a plane containing axes of joints of pins of the chain.

* * * * *